United States Patent [19]

Kuhn

[11] Patent Number: 5,497,582
[45] Date of Patent: Mar. 12, 1996

[54] CRABBING BAIT HOLDER

[76] Inventor: Thomas J. Kuhn, 353 Cedar Swamp Rd., Jackson, N.J. 08527

[21] Appl. No.: 450,489

[22] Filed: May 26, 1995

[51] Int. Cl.⁶ .......................... A01K 69/00; A01K 97/02
[52] U.S. Cl. ............................................. 43/44.99; 43/100
[58] Field of Search .................................. 43/100, 44.99, 43/55, 102

[56] References Cited

U.S. PATENT DOCUMENTS 4,527,350  7/1985  Tockey, Jr. ................................. 43/55
5,319,875  6/1994  Brandolino ............................ 43/44.99

Primary Examiner—Richard K. Seidel
Assistant Examiner—Jeanne M. Elpel
Attorney, Agent, or Firm—Charles I. Brodsky

[57] ABSTRACT

A crabbing bait holder comprises a frame including a pair of joined planar members foldably openable to add a solid bait therebetween and foldably closable to hold the bait in position, with a plurality of eyeholes and locking tab lengths about the top, bottom and side edges of the frame to secure the planar members at a distance varying with the thickness of the bait held in place. The frame may be raised or lowered into the water by a drop-line, fed manually or from a reel, and is in the general shape of an open grid constructed of a rigid nature to support the weight of one or more crabs holding onto the frame with their claws while eating at the bait inside. A further weight, included where the drop-line joins the folded-over planar members, steadies the frame against water currents and the chomping actions of the crab when eating. Upon raising the frame from the water, any crabs holding onto the frame can be simply scooped off.

7 Claims, 2 Drawing Sheets

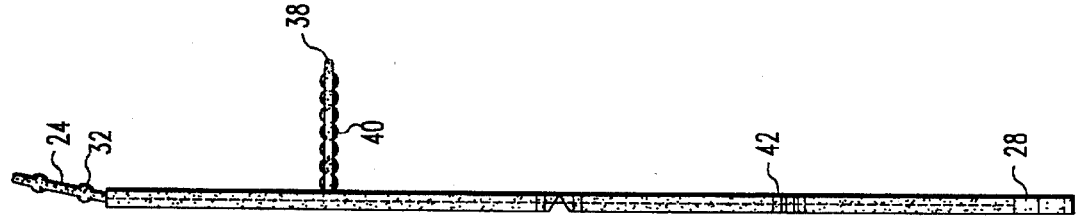
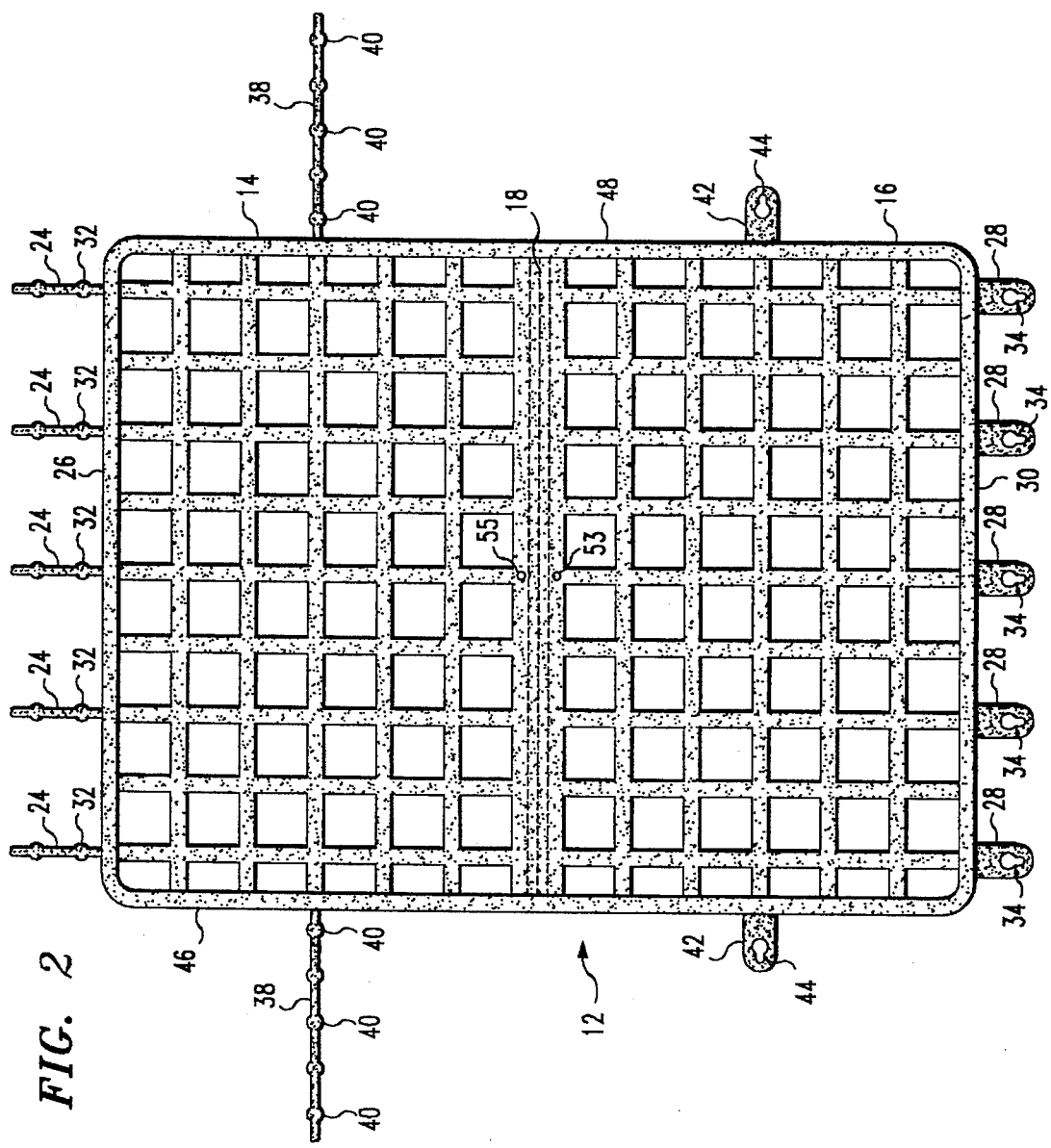

CRABBING BAIT HOLDER

FIELD OF THE INVENTION

This invention relates to a crabbing bait holder and, more particularly, to one which can be lowered into the water, and raised therefrom, by a drop-line fed manually or from a reel.

BACKGROUND OF THE INVENTION

As is well known and understood, the most common and cheapest way to go recreational crabbing is simply to hand-feed a crab line into the water with a stainless steel hook at its end baited in any appropriate manner. As is also known from experience, a disadvantage of crabbing in that manner is that the bait deteriorates in the water, and over time, so as to pull away from the hook simply due to the weight of the crab holding onto the bait while eating. While such usage envisions the raising of the line with the crab holding onto the bait - - - and then to be scooped off the bait - - -, such visions are frequently dashed upon seeing the crab and its weight simply tear off a piece of the bait, falling back into the water, as the line is either pulled or reeled in.

As is also well known, one common way of avoiding this is through the design of what are termed "crab-traps", which ensnare the crab when it is eating, attracted by the scents of the bait fish. While greatly offsetting the problem of the crab falling away from the remainder of the bait by its own sheer weight, one of the disadvantages of these traps is their added cost - - - typically selling at retail for upwards of $7.50–$10.00, and more.

BACKGROUND OF THE INVENTION

It is an object of the present invention, therefore, to provide a new and improved crabbing bait holder, which avoids the problem of the crab falling from the line because of its own weight.

It is another object of the invention to provide a new and improved crabbing bait holder which continues to allow a crab to be scooped from off the line when the line is pulled from the water.

It is an additional object of the invention to provide a new and improved crabbing bait holder which can be manufactured and sold at a price significantly less than that associated with the manufacture and sale of crabbing traps.

It is yet another object of the invention to provide a new and improved crabbing bait holder which can be lowered into the water, and raised therefrom, by a drop-line, either fed manually or from a reel.

It is also an object of the invention to provide such a crabbing bait holder which permits the catching and scooping-off of more than one crab at any instant of time.

SUMMARY OF THE INVENTION

As will become clear from the following description, these objects of the invention are obtainable through the use of a crabbing bait holder which comprises a frame including a pair of joined planar members which are foldably openable to add a solid bait therebetween and foldably closable to hold such bait in position. As will be described, the frame is provided with a plurality of eyeholes and locking tab lengths about its top, bottom and side edges, so as to secure the planar members - - - and the bait held thereby - - - at a distance varying with the thickness of the bait then held in place. In the preferred embodiment to be described, such frame will be noted to be in the general shape of an open grid construction of a rigid nature to support the weight of one or more crabs holding onto the frame with their claws while eating at the bait inside. A further weight, included where the drop-line joins the folded-over planar members steadies the frame against water currents, and the chomping action of the crab when eating. As will be appreciated, one or more crabs are thus able to hold onto the rigid frame while eating, and the raising of the frame by the drop-line serves to allow all the weight to be centered on the frame, rather than upon the bait fish secured inside - - - thereby greatly reducing any tendency for the crab to fall away as the bait is torn or otherwise deteriorates over time. As will be described, the locking tab lengths incorporate a series of protruding tabs which secure in position with a key arrangement in the eyeholes employed.

BRIEF DESCRIPTION OF THE DRAWING

These and other features of the present invention will be more clearly understood from a consideration of the following description, taken in connection with the accompanying drawing, in which:

FIG. 2 is a front view of the crabbing bait holder prior to assembly and insertion of the bait fish; and FIG. 3 is a side view of the unassembled crabbing bait holder, of which FIG. 2 is its front view.

DETAILED DESCRIPTION OF THE DRAWING

Figure 1:
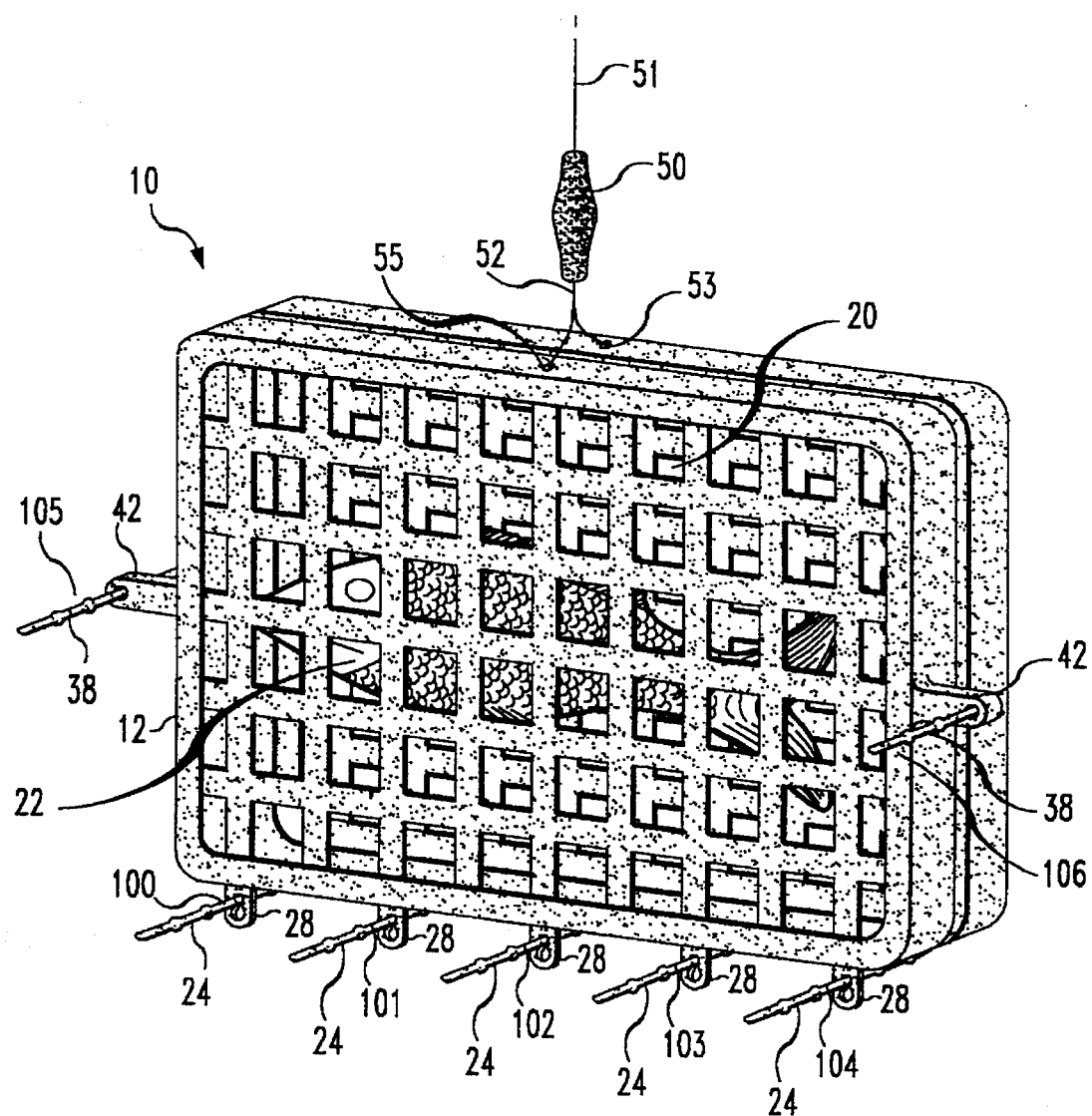
FIG. 1 illustrates the crabbing bait holder embodying the invention as it would appear with a bait fish secured in place, ready for lowering into the water.

In the drawing the crabbing bait holder 10 comprises a frame 12 including a pair of joined planar members 14, 16, which are openable and closable about a fold line 18. Preferably constructed of a low density polyethylene or ABS plastic material, the frame 12 is shown in the general shape of an open grid construction 20 within which a solid bait fish 22 is to be held. Intended to be molded, the frame 12 includes a plurality - - - in this case five - - - of locking tab lengths 24 extending from its top edge 26 and a like number of eyeholes 28 extending from its bottom edge 30. As shown, the locking tab lengths 24 include a series of spaced apart tab protrusions 32 oriented to be passed through an aligned key arrangement 34 in each of the eyeholes 28, and to then be secured thereby once released. Reference numerals 100, 101, 102, 103, 104 in FIG. 1 thus correspond to the locking tab lengths 24 going from left-to-right in FIG. 2 passing through the eyeholes 28 when the planar members 14, 16 are folded into the plane of the paper about the fold line 18.

Also shown in FIG. 2 are further locking tab lengths 38 with their own tab protrusions 40 and similar eyeholes 42 with their key arrangements 44, although fewer in number than the corresponding locking tab lengths 24 and eyeholes 28 - - - two in number as compared with five in number. Shown as extending from the side edges 46, 48 of the frame 12, these locking tab lengths 38 are inserted through the eyeholes 42 to close off the crabbing bait holder 10 after the planar members 14, 16 are folded over about the fold line 18. As will be appreciated, reference numeral 105 in FIG. 1 corresponds to the insertion of the locking tab length 38 passing through the eyehole 42 at the side edge 46 of FIG. 2, while reference numeral 106 identifies the locking tab length 38 passing through the eyehole 42 at the side edge 48 of FIG. 2. As will be appreciated, the number of tab protrusions 32 and 40 which extend through their respective key arrangements 34 and 44 depend upon the thickness of the bait fish 22, in establishing the distance between the planar members 14, 16 in securing the bait in place.

As shown in FIG. 1, the crabbing bait holder 10 may be lowered into the water, or raised therefrom, by a drop-line 51, fed manually or from a reel, along with a weight 50 at the end 52 of the drop-line 51 at a point where such line couples to the frame 10. More particularly shown by the reference numerals 53, 55, the drop-line 51 is coupled to the frame 12 at opposing sides of the fold line 18, as indicated in FIG. 2. Such weight 50 will be understood to steady the frame 12 against water currents and the chomping action of the crabs holding onto the frame 10 when eating.

As will be readily understood by those skilled in the art, the low density polyethylene and ABS plastic frame 12 provides a rigid support for the weight of one or more crabs that may be holding onto the frame with their claws while eating. As will also be apparent, such frame continues to support their weight when raising the crabbing bait holder 10 from the water even while the bait fish is torn away by the chomping action - - - as with the invention, it is the frame 12 that then supports the weight of the crab(s), instead of the consistency of the bait itself. Analysis has shown that a crabbing bait holder of this arrangement can be manufactured to sell at retail for between $1.75 and $2.00, depending upon the construction of the reel, if any, that may be employed, as compared to just feeding the line manually.

While there have been described what are considered to be preferred embodiments of the invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A crabbing bait holder comprising:

a frame including a pair of joined planar members foldably openable to add a solid bait therebetween and foldably closable to hold the bait in position;

said frame also including a plurality of eyeholes and locking tab lengths oriented about top, bottom and side edges thereof to secure the planar members at a distance varying with the thickness of the bait and with the length of locking tabs inserted through said eyeholes;

said frame being in the general shape of an open grid construction of a rigid material to support the weight of one or more crabs holding onto the frame with their claws while eating at the bait;

and a drop-line coupled to said frame for raising and lowering said frame into the water.

2. The crabbing bait holder of claim 1 wherein said frame includes a greater number of eyeholes and locking tab lengths oriented about said top and bottom edges of said frame than about said side edges.

3. The crabbing bait holder of claim 2 wherein said frame includes five eyeholes and locking tab lengths oriented about said top and bottom edges of said frame, and two eyeholes and locking tab lengths about said side edges.

4. The crabbing bait holder of claim 1 also including a weight at an end of said drop-line at a point where said drop-line couples to said frame.

5. The crabbing bait holder of claim 1 wherein said drop-line couples to said frame adjacent to a line about which said pair of joined planar members foldably open and close.

6. The crabbing bait holder of claim 5 wherein said drop-line couples to said frame at opposing sides of said fold line.

7. The crabbing bait holder of claim 1 wherein said frame is constructed of a low density polyethylene or ABS plastic material.

* * * * *